United States Patent
Jang et al.

(10) Patent No.: US 9,929,609 B2
(45) Date of Patent: Mar. 27, 2018

(54) STATOR FOR MOTOR

(71) Applicant: NEW MOTECH CO., LTD., Gwangju (KR)

(72) Inventors: Jeong Cheol Jang, Gwangju (KR); Wang gyu Jeong, Gwangju (KR); Ji Min Lee, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 276 days.

(21) Appl. No.: 14/888,455

(22) PCT Filed: Mar. 13, 2014

(86) PCT No.: PCT/KR2014/002100
§ 371 (c)(1),
(2) Date: Nov. 2, 2015

(87) PCT Pub. No.: WO2014/208867
PCT Pub. Date: Dec. 31, 2014

(65) Prior Publication Data
US 2016/0118850 A1    Apr. 28, 2016

(30) Foreign Application Priority Data

Jun. 24, 2013  (KR) .................. 10-2013-0072355

(51) Int. Cl.
*H02K 1/18* (2006.01)
*H02K 3/34* (2006.01)
(52) U.S. Cl.
CPC ............. *H02K 1/187* (2013.01); *H02K 3/345* (2013.01)

(58) Field of Classification Search
CPC .......... H02K 1/18; H02K 1/182; H02K 1/185; H02K 1/187; H02K 3/345
USPC .................. 310/43, 45, 51, 91, 254
See application file for complete search history.

(56) References Cited

U.S. PATENT DOCUMENTS

| 1,384,246 | A | * | 7/1921 | Durnell ..................... E06B 9/50 |
| | | | | 248/252 |
| 5,663,601 | A | * | 9/1997 | Wakabayashi ........... H02K 3/30 |
| | | | | 310/179 |
| 6,351,042 | B1 | * | 2/2002 | Takayanagi ............ H02K 1/187 |
| | | | | 29/596 |

(Continued)

FOREIGN PATENT DOCUMENTS

JP    2000-116037 A    4/2000
KR  20-1991-0021089 A   12/1991

(Continued)

OTHER PUBLICATIONS

International Search Report for PCT/KR2014/002100 dated Jun. 3, 2014 from Korean Intellectual Property Office.

*Primary Examiner* — Quyen Leung
*Assistant Examiner* — Eric Johnson
(74) *Attorney, Agent, or Firm* — Revolution IP, PLLC

(57) ABSTRACT

The present invention relates to a stator for a motor including: a stator core having a circular base along which a plurality of first holes is formed vertically and a plurality of teeth formed radially around the outer peripheral surface of the base; and an insulating layer coated on the entire surface of the stator core except the inner peripheral surface of the base and the plurality of first holes of the base.

7 Claims, 3 Drawing Sheets

(56) References Cited

U.S. PATENT DOCUMENTS

| | | | |
|---|---|---|---|
| 6,492,756 B1 * | 12/2002 | Maslov | B62M 6/40 310/156.12 |
| 6,993,822 B2 * | 2/2006 | Park | H02K 1/148 29/596 |
| 7,221,068 B2 * | 5/2007 | Yoshimura | H02K 1/04 310/216.018 |
| 2003/0104246 A1 | 6/2003 | Watanabe et al. | |
| 2003/0193264 A1 * | 10/2003 | Pyntikov | H02K 1/141 310/254.1 |
| 2005/0236913 A1 * | 10/2005 | Yoshimura | H02K 1/04 310/45 |
| 2006/0091739 A1 | 5/2006 | Hilton et al. | |
| 2009/0179517 A1 * | 7/2009 | Lu | H02K 1/148 310/216.009 |
| 2010/0327676 A1 * | 12/2010 | Bi | H02K 1/187 310/51 |
| 2013/0140926 A1 * | 6/2013 | Bailey | H02K 1/187 310/71 |
| 2013/0328438 A1 | 12/2013 | Jang et al. | |
| 2014/0203671 A1 * | 7/2014 | Ha | H02K 1/04 310/43 |

FOREIGN PATENT DOCUMENTS

| | | |
|---|---|---|
| KR | 10-0301492 B1 | 9/2001 |
| KR | 20-0408923 Y1 | 2/2006 |
| KR | 10-0808194 B1 | 2/2008 |
| KR | 10-1135333 B1 | 4/2012 |

* cited by examiner

[Fig. 1]
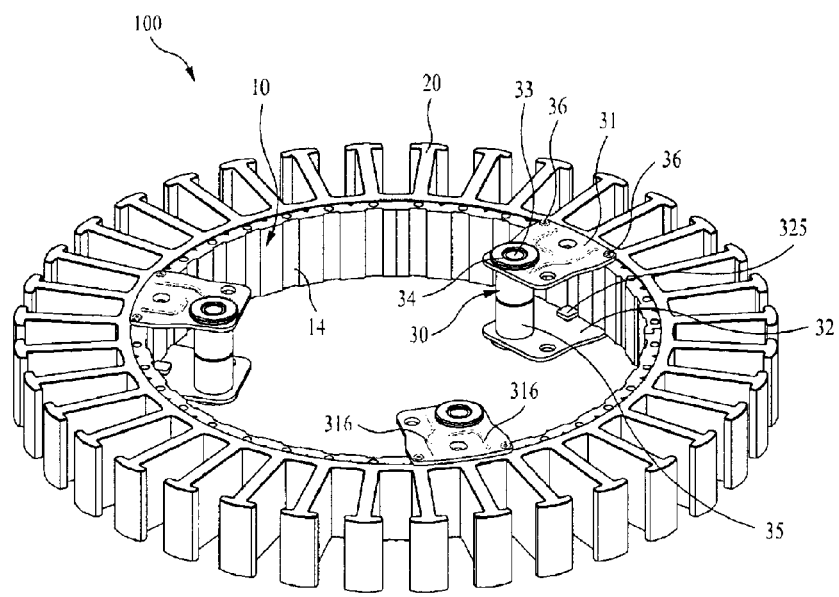
[Fig. 2]
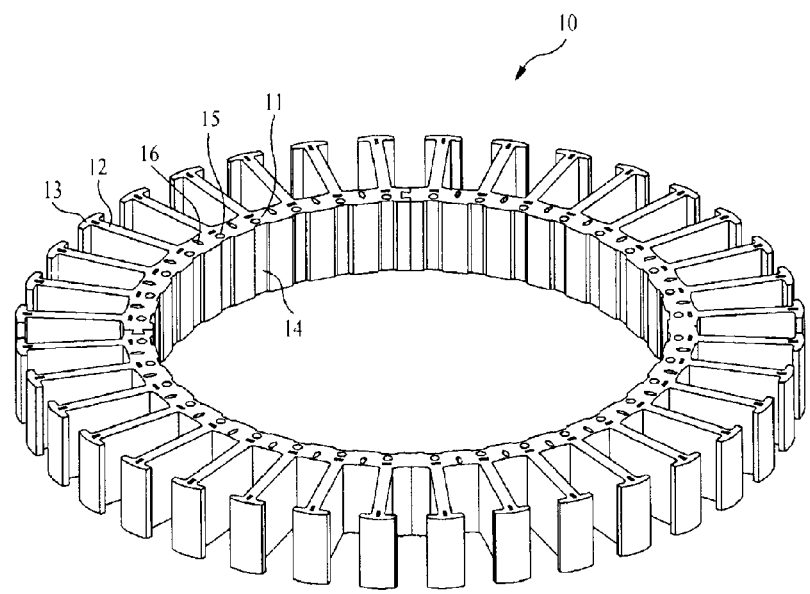

[Fig. 3]
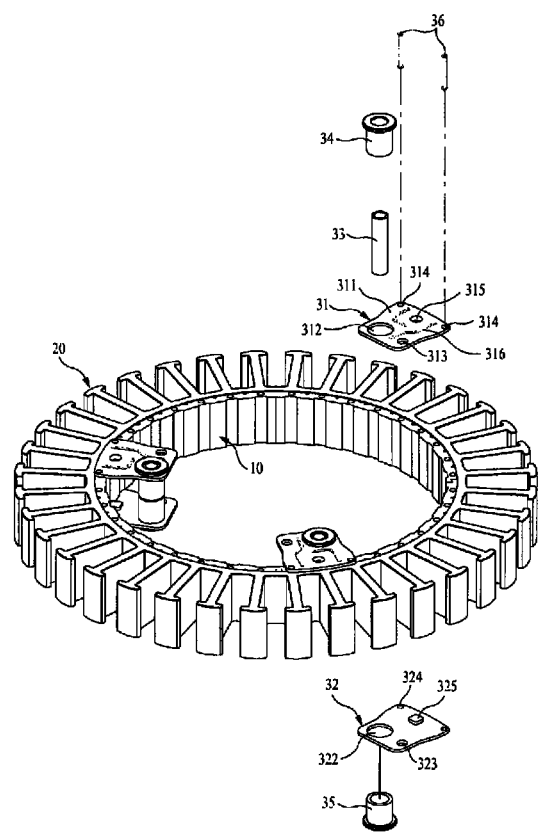

[Fig. 4]
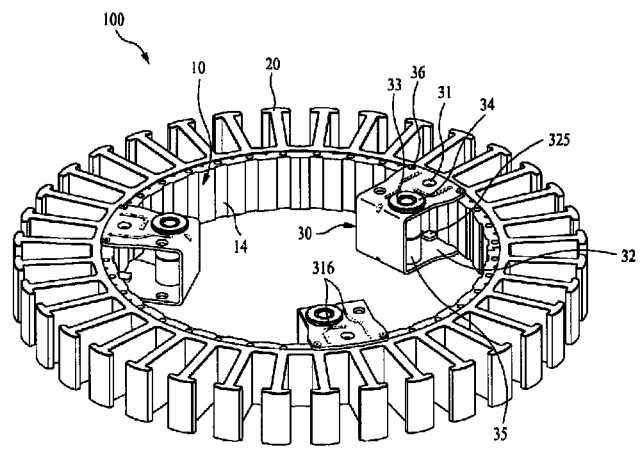
[Fig. 5]
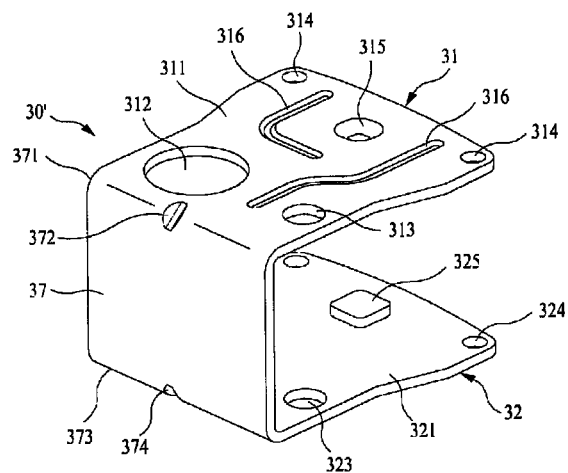

STATOR FOR MOTOR

CROSS REFERENCE TO PRIOR APPLICATIONS

This application is a National Stage Application of PCT International Patent Application No. PCT/KR2014/002100 filed on Mar. 13, 2014, under 35 U.S.C. § 371, which claims priority to Korean Patent Application No. 10-2013-0072355 filed on Jun. 24, 2013, which are all hereby incorporated by reference in their entirety.

TECHNICAL FIELD

The present invention relates to a motor, and more particularly, to a stator for a motor that does not have any separate insulator or insulating film adapted to insulate teeth of a stator core, thus providing simple configuration and low manufacturing cost.

BACKGROUND ART

Generally, a motor has a stator and a rotor rotatably disposed inside or outside the stator. The stator includes a stator core having a circular base and a plurality of teeth formed radially around the outer or inner peripheral surface of the base.

So as to wind coils on the teeth, insulation treatment should be conducted on the surface of the stator core having the teeth, and accordingly, an insulator, which is made of an insulating plastic material, is coupled to the stator core so as to insulate the surface of the stator core from the coils. Alternatively, insulating powder is coated on the surface of the stator core, or an insulating film made of insulating resin is inserted into a slot between the neighboring teeth.

In case of a motor for rotating a washing tub of a washing machine, on the other hand, the motor having a stator is coupled to a body of the washing machine by means of coupling parts protrudedly formed from the inner peripheral surface of the stator. Conventional stators having such coupling parts have been disclosed in Korea Patent Nos. 10-301492 (Prior art 1), 10-0808194 (Prior art 2), and 10-1135333 (Prior art 3).

Referring to Prior art 1, coupling parts are formed every steel plate, and next, the plurality of steel plates are punched and laminated to top of each other, thus completing the formation of the stator core and the coupling parts.

Referring to Prior art 2, upper and lower insulators are coupled to the upper and lower portions of the stator core, and the coupling parts are formed on each insulator, so that when the upper and lower insulators are coupled to the stator core, the formation of the coupling parts is finished.

Referring to Prior art 3, L-shaped coupling parts are attached to the inner peripheral surface of the stator core, and next, insulating powder is coated on the entire surface of the stator core.

In case of Prior art 1, however, the coupling parts are formed every steel plate, thus undesirably increasing the quantity of steel plate consumed and the quantity of scrap generated therefrom. Further, the formation of the coupling parts is applicable in case where the steel plates are laminated to constitute the stator core, but it is not applicable in case of a spiral stator core in which the stator core is laminated in a spiral shape.

In case of Prior art 2, separate molds are needed for manufacturing the upper and lower insulators, and further, when the upper and lower insulators are coupled to the stator core, the slots between the teeth are reduced in size due to the thicknesses of the upper and lower insulators to cause the limitations in the number of turns of coils, so that electromagnetic characteristics required for the stator do not satisfy a user's needs. Furthermore, the quantity of plastic resin used for forming the coupling parts is increased to cause high manufacturing cost.

In case of Prior art 3, the insulating powder is coated after the L-shaped coupling parts have been coupled to the stator core, and accordingly, the insulating powder should be coated on the entire surface of the stator core, thus increasing the quantity of insulating powder consumed. Further, the L-shaped coupling parts are attached by means of typical welding, which does not ensure their rigid coupled result.

Therefore, there is a definite need for the development of a new stator for a motor capable of solving the above-mentioned problems.

DISCLOSURE OF INVENTION

Technical Problem

Accordingly, the present invention has been made in view of the above-mentioned problems occurring in the prior art, and it is an object of the present invention to provide a stator for a motor that can be simple in the manufacturing process and reduced in the manufacturing cost.

Solution to Problem

To accomplish the above-mentioned object, according to the present invention, there is provided a stator for a motor including: a stator core having a circular base along which a plurality of first holes is formed vertically and a plurality of teeth formed radially around the outer peripheral surface of the base; and an insulating layer coated on the entire surface of the stator core except the inner peripheral surface of the base and the plurality of first holes of the base.

According to the present invention, preferably, the stator for a motor further includes coupling parts coupled to the inner peripheral surface of the base, each coupling part including: a bush; an upper bracket having a bush insertion hole into which the bush is inserted and rivet insertion holes formed thereon at the corresponding positions to the first holes; and a lower bracket having a bush insertion hole into which the bush is inserted and rivet insertion holes formed thereon at the corresponding positions to the first holes.

According to the present invention, preferably, the base has a plurality of guide grooves formed along the inner peripheral surface thereof, and the upper bracket and the lower bracket have guide protrusions formed thereon, the guide protrusions being insertedly mounted into the guide grooves.

According to the present invention, preferably, each coupling part further comprises upper and lower insulating bushes coupledly fitted to the upper and lower peripheries of the bush.

According to the present invention, preferably, the upper bracket has reinforcing ribs formed on the top portion thereof, and the lower bracket has reinforcing ribs formed on the underside thereof.

According to the present invention, preferably, the end portion of the upper bracket is connected to the end portion of the lower bracket by means of a bracket connector.

According to the present invention, preferably, the bracket connector has an upper curved surface formed on the upper portion thereof and a lower curved surface formed on the lower portion thereof.

According to the present invention, preferably, the upper curved surface has an upper reinforcing rib formed thereon and the lower curved surface has a lower reinforcing rib formed thereon.

According to the present invention, preferably, the insulating layer comprises a first coated layer to which adhesive resin is applied and a second coated layer to which insulating resin is applied.

Advantageous Effects of Invention

According to the present invention, the stator for a motor can be simple in the manufacturing process and reduced in the manufacturing cost.

BRIEF DESCRIPTION OF DRAWINGS

FIG. 1 is a perspective view showing a stator for a motor according to a first embodiment of the present invention.

FIG. 2 is a perspective view showing a stator core of the stator for a motor according to the first embodiment of the present invention.

FIG. 3 is an exploded perspective view showing the coupling parts of the stator for a motor according to the first embodiment of the present invention.

FIG. 4 is a perspective view showing a stator for a motor according to a second embodiment of the present invention.

FIG. 5 is a perspective view showing a U-shaped bracket of the stator for a motor according to the second embodiment of the present invention.

MODE FOR THE INVENTION

Hereinafter, an explanation on a stator for a motor according to the present invention will be in detail given with reference to the attached drawings.

FIG. 1 is a perspective view showing a stator for a motor according to a first embodiment of the present invention.

As shown in, a stator 100 for a motor according to the present invention largely includes a stator core 10, an insulating layer 20, and coupling parts 30.

The stator core 10 includes a circular base 11, a plurality of teeth 12 formed radially around the outer peripheral surface of the base 11, and teeth ears 13 formed on the end portions of the teeth 12. Coils (not shown) are wound around the teeth 12. In FIG. 1, the teeth 12 are formed outwardly from the base 11, but they may be formed inwardly from the base 11. The stator core 10 is made by laminating a plurality of thin punched electric steel plates on top of each other or made through spiral lamination in which the stator core is wound and laminated to a spiral shape. According to the present invention, the stator core 10 is applicable to all of the two manufacturing methods. A detailed structure of the stator core 10 will be explained with reference to FIG. 2.

FIG. 2 is a perspective view showing the stator core of the stator for a motor according to the first embodiment of the present invention.

Referring to FIG. 2, the stator core 10 has a plurality of guide grooves 14 repeatedly formed along the inner peripheral surface of the base 11. The guide grooves 14 serve to guide the coupled position of the stator core 10 when the coupling parts 30 are coupled to the stator core 10, so that the stator core 10 can be rigidly coupled to the coupling parts 30. The number of guide grooves 14 is not separately defined, but it is provided minimally to allow the stator core 10 to be coupled to the coupling parts 30. As shown in FIGS. 1 and 2, the guide grooves 14 are desirably formed equally spaced apart from each other on the inner peripheral surface of the base 11.

A plurality of first holes 15 and a plurality of second holes 16 are formed along the top end periphery of the base 11, and through the plurality of first holes 15, the coupling parts 30 are coupled to the base 11 of the stator core 10. The number of first holes 15 is not separately defined, but provided sufficiently to allow the stator core 10 to be coupled to the coupling parts 30. As shown in FIGS. 1 and 2, the first holes 15 are desirably formed equally spaced apart from each other on the top end periphery of the base 11.

The second holes 16 are selectively formed on the top end periphery of the base 11, which are used to couple the stator core 10 to an insulator made of an insulating resin or a hall sensor assembly. The number or position of second holes 16 is not separately defined, and therefore, they may be formed at appropriate positions and in appropriate numbers.

Referring back to FIG. 1, the stator 100 according to the present invention has the insulating layer 20 formed on the stator core 10.

The insulating layer 20 is formed to insulate the surface of the stator core 10 from the coils. That is, when the coils are wound on the teeth 11, the insulating layer 20 is adapted to insulate the stator core 10 from the coils.

The insulating layer 20 is desirably formed by injecting and coating insulating resin to a form of powder, but may be formed in various insulation coating ways like dipping. According to the present invention, the insulating layer 20 is formed by primarily applying adhesive resin to the surface of the stator core 10 and secondarily applying insulating resin to the surface of the applied adhesive resin. Through the coating conducted over two times, accordingly, the insulation performance and the adhering performance of the insulating layer 20 can be improved.

According to the present invention, the insulating layer 20 is not formed on the entire surface of the stator core 10, but formed on the entire surface of the teeth 12 and a portion of the base 11. In more detail, the insulating layer 20 is not formed on the inner peripheral surface of the base 11 and around the first holes 15 formed on the top and underside of the base 11. That is, the insulating layer 20 is coated on the entire surface of the stator core 10 except the inner peripheral surface of the base 11 and the first holes 15 formed on the top and underside of the base 11. If the insulating layer 20 is formed on the first holes 15, the first holes 15 may be blocked by means of the materials coated thereon. As the insulating layer 20 is not formed on the inner peripheral surface of the base 11, further, the quantity of the insulating materials used can be reduced.

According to the first embodiment of the present invention, the coupling parts 30 are disposed along the inner peripheral surface of the base 11 of the stator core 10. The coupling parts 30 are provided to couple the stator 100 of the motor to a body (not shown) of an electric appliance like a washing machine. The number of coupling parts 30 is not separately defined, but at least three or more coupling parts 30 are symmetrically disposed as shown in FIG. 1, so that the stator 100 can be rigidly coupled to the motor.

A detailed structure of each coupling part 30 will be explained with reference to FIG. 3.

FIG. 3 is an exploded perspective view showing each coupling part of the stator for a motor according to the first embodiment of the present invention.

As shown in FIG. 3, the coupling part 30 of the stator 100 according to the first embodiment of the present invention includes an upper bracket 31, a lower bracket 32 and a coupling bush 33.

The upper bracket 31 has a plate 311 desirably made of a metal material having high strength, and the plate 311 has a bush insertion hole 312, an arrangement hole 313 and rivet insertion holes 314 formed thereon. Further, the plate 311 has a guide protrusion 315 and reinforcing ribs 316 formed thereon. The lower bracket 32 is made of the same material as the upper bracket 31 and has a mirror-symmetrical structure with respect to the upper bracket 31. In the same manner as the upper bracket 31, the lower bracket 32 has a bush insertion hole 322, an arrangement hole 323, rivet insertion holes 324 and a guide protrusion 325 formed thereon. Even if not shown in FIG. 3, reinforcing ribs are formed on the lower bracket 32. The lower bracket 32 has the same structure as the upper bracket 31 except that it has the mirror-symmetrical structure with respect to the upper bracket 31, and therefore, an explanation on the coupling part 30 will be given with reference to the upper bracket 31. For the brevity of the description, accordingly, an explanation on the components of the lower bracket 32 will be avoided.

The bush insertion hole 312 is formed to insert the coupling bush 33 thereinto. The coupling bush 33 is desirably made of a metal material having high strength, into which a member like a bolt is inserted to fixedly couple the motor to the body of the electric appliance. Upper and lower insulating bushes 34 and 35 made of insulating resin are coupledly fitted to the upper and lower peripheries of the coupling bush 33, thus preventing the electric current generated from the stator core 10 from flowing to the body of the electric appliance.

The arrangement hole 313 is formed to provide an accurate position to the stator 100 when the stator 100 is coupled to the body of the electric appliance. Further, the body of the electric appliance has a protrusion formed correspondingly to the arrangement hole 313, thus providing an accurate coupling position with the stator 100.

The upper bracket 31 and the lower bracket 32 are fixed to the base 11 by means of rivets 36. The rivets 36 are coupledly passed through the rivet insertion holes 314 of the upper bracket 31, the first holes 15 formed on the base 11, and the rivet insertion holes 324 of the lower bracket 32, thus fixing the upper bracket 31 and the lower bracket 32 to the base 11 of the stator core 10.

The guide protrusion 315 is a portion insertedly formed at each guide groove 14 formed on the inner peripheral surface of the stator core 10. Accordingly, the guide protrusion 315 is formed at the corresponding position to each guide groove 14 formed on the inner peripheral surface of the stator core 10. In FIG. 3, one guide protrusion 315 is formed, but two or more guide protrusions may be formed. The two guide protrusions 315 are insertedly mounted into the guide grooves 14 adjacent to each other, and alternatively, they may be insertedly mounted into one guide groove 14. If necessary, the number of guide protrusions 315, the number of guide grooves 14, and the structure of the plate 311 may be freely changed.

The reinforcing ribs 316 are formed to reinforce the strength of the plate 311, which are desirably formed in the shape of grooves formed on the top surface of the plate 311. Instead of the groove-forming manner, however, separate reinforcing members may be bonded to the top surface of the plate 311. If necessary, of course, the number of reinforcing ribs 316 may be freely changed in accordance with the sizes of the plate 311.

FIG. 4 is a perspective view showing a stator for a motor according to a second embodiment of the present invention.

As shown in FIG. 4, a stator 200 for a motor according to a second embodiment of the present invention has the same configuration as that according to the first embodiment of the present invention except that a U-shaped bracket 30 is provided as the coupling part 30. An explanation on the U-shaped bracket 30 will be in detail given with reference to FIG. 5.

FIG. 5 is a perspective view showing the U-shaped bracket in the stator for a motor according to the second embodiment of the present invention.

Referring to FIG. 5, the U-shaped bracket 30 is configured wherein an upper bracket 31 and a lower bracket 32 are connected to each other by means of a bracket connector 37. The upper bracket 31 and the lower bracket 32 have the same structure as those in the first embodiment of the present invention, and therefore, an explanation on them will be avoided for the brevity of the description.

The bracket connector 37 has an upper curved surface 371 formed on the upper end portion thereof and a lower curved surface 373 formed on the lower end portion thereof, and the upper curved surface 371 has an upper reinforcing rib 372 formed thereon, while the lower curved surface 373 having a lower reinforcing rib 374 formed thereon. The upper reinforcing rib 372 and the lower reinforcing rib 374 are desirably formed to the shape of grooves so as to reinforce the strength on the curved surfaces of the bracket connector 37, but separate reinforcing members may be bonded to the curved surfaces of the bracket connector 37.

While the present invention will be described with reference to the particular illustrative embodiments, it is not to be restricted by the embodiment but only by the appended claims. It is to be appreciated that those skilled in the art can change or modify the embodiments without departing from the scope and spirit of the present invention.

The invention claimed is:

1. A stator for a motor comprising:
a stator core having a circular base along which a plurality of first holes is formed vertically and a plurality of teeth formed radially around the outer peripheral surface of the base;
an insulating layer coated on the entire surface of the stator core except the inner peripheral surface of the base and the plurality of first holes of the base; and
coupling parts coupled to the inner peripheral surface of the base, wherein the coupling parts comprises:
an upper bracket having a bush insertion hole, and rivet insertion holes formed thereon at the corresponding positions to the first holes;
a lower bracket having a bush insertion hole, and rivet insertion holes formed thereon at the corresponding positions to the first holes;
a bush configured to be inserted into the bush insertion hole of the upper bracket and the bush insertion hole of the lower bracket; and
rivets configured to be inserted into the rivet insertion holes of the upper bracket, the first holes, and the rivet insertion holes of the lower bracket to fix the upper bracket and the lower bracket to the base.

2. The stator for a motor according to claim 1, wherein the base has a plurality of guide grooves formed along the inner peripheral surface thereof, and the upper bracket and the lower bracket have guide protrusions formed thereon, the guide protrusions being insertedly mounted into the guide grooves.

3. The stator for a motor according to claim 1, wherein each coupling part further comprises upper and lower insulating bushes coupledly fitted to the upper and lower peripheries of the bush.

4. The stator for a motor according to claim 1, wherein the upper bracket has reinforcing ribs formed on a top portion thereof, and the lower bracket has reinforcing ribs formed on an underside thereof.

5. The stator for a motor according to claim 1, wherein an end portion of the upper bracket is connected to an end portion of the lower bracket by means of a bracket connector.

6. The stator for a motor according to claim 5, wherein the bracket connector has an upper curved surface formed on the upper portion thereof and a lower curved surface formed on the lower portion thereof.

7. The stator for a motor according to claim 6, wherein the upper curved surface has an upper reinforcing rib formed thereon and the lower curved surface has a lower reinforcing rib formed thereon.

\* \* \* \* \*